(12) United States Patent
Cha et al.

(10) Patent No.: US 10,002,085 B2
(45) Date of Patent: Jun. 19, 2018

(54) PERIPHERAL COMPONENT INTERCONNECT (PCI) DEVICE AND SYSTEM INCLUDING THE PCI

(71) Applicant: SAMSUNG ELECTRONICS CO., LTD., Suwon-si, Gyeonggi-Do (KR)

(72) Inventors: Hyun Seok Cha, Osan-si (KR); Yong Tae Jeon, Pohang-si (KR); Ki Chul Noh, Suwon-si (KR); Ki Jo Jung, Gwacheon-si (KR); Chandrashekar Tandavapura Jagadish, Mysore (IN); Vamshi Krishna Komuravelli, Telangana (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 264 days.

(21) Appl. No.: 14/938,994

(22) Filed: Nov. 12, 2015

(65) Prior Publication Data

US 2016/0147676 A1 May 26, 2016

(30) Foreign Application Priority Data

Nov. 20, 2014 (IN) ............................. 5837/CHE/2014
Feb. 25, 2015 (KR) ........................ 10-2015-0026426

(51) Int. Cl.
*G06F 13/16* (2006.01)
*G06F 13/42* (2006.01)
*G06F 13/40* (2006.01)

(52) U.S. Cl.
CPC .......... *G06F 13/16* (2013.01); *G06F 13/4068* (2013.01); *G06F 13/4282* (2013.01)

(58) Field of Classification Search
CPC ............... G06F 13/404; G06F 13/4282; G06F 2213/0024; G06F 2213/0026
See application file for complete search history.

(56) References Cited

U.S. PATENT DOCUMENTS

| | | | |
|---|---|---|---|
| 5,913,045 A | 6/1999 | Gillespie et al. | |
| 6,128,718 A * | 10/2000 | Schmisseur | G06F 9/342 |
| | | | 711/211 |
| 6,292,855 B1 | 9/2001 | Johnson et al. | |
| 6,832,278 B2 | 12/2004 | Oshins et al. | |
| 6,931,457 B2 | 8/2005 | Bissessur et al. | |
| 7,281,077 B2 | 10/2007 | Woodral | |
| 7,457,897 B1 | 11/2008 | Lee et al. | |
| 7,543,096 B2 | 6/2009 | Davies | |
| 7,702,827 B2 | 4/2010 | Biran et al. | |
| 7,849,242 B2 | 12/2010 | Lee et al. | |

(Continued)

*Primary Examiner* — Brian T Misiura
(74) *Attorney, Agent, or Firm* — Volentine, Whitt & Francos, PLLC

(57) ABSTRACT

A peripheral component interconnect (PCI) device includes a PCI register including a base address register (BAR) configured to determine a first memory area accessed by a PCI host, an offset register configured to store an offset transmitted from the PCI host, an address translation unit (ATU) configured to detect an operation of the PCI host writing the offset to the offset register and to change an accessed area by the PCI host to a second memory area based on the offset stored in the offset register, and a device memory including the first memory area and the second memory area, the device memory configured to store data transmitted from the PCI host and to transmit data stored therein to the PCI host.

20 Claims, 12 Drawing Sheets

(56) References Cited

U.S. PATENT DOCUMENTS

| | | | |
|---|---|---|---|
| 7,886,095 B2* | 2/2011 | Kurihara | G06F 13/423 |
| | | | 710/104 |
| 7,934,033 B2 | 4/2011 | Malwankar et al. | |
| 8,122,177 B1 | 2/2012 | Puranik | |
| 8,478,916 B2 | 7/2013 | Asnaashari | |
| 8,621,138 B2 | 12/2013 | Olbrich et al. | |
| 8,700,834 B2 | 4/2014 | Horn et al. | |
| 9,021,141 B2* | 4/2015 | El-Batal | G06F 13/385 |
| | | | 710/1 |
| 9,146,890 B1* | 9/2015 | Brown | G06F 13/4022 |
| 9,690,739 B2* | 6/2017 | Shao | G06F 13/4221 |
| 9,753,883 B2* | 9/2017 | Stark | G06F 13/4234 |
| 2009/0019266 A1* | 1/2009 | Maeda | G06F 9/30047 |
| | | | 712/220 |
| 2014/0146067 A1 | 5/2014 | Doddapuneni et al. | |
| 2016/0098358 A1* | 4/2016 | Cha | G06F 12/1081 |
| | | | 710/313 |

* cited by examiner

PERIPHERAL COMPONENT INTERCONNECT (PCI) DEVICE AND SYSTEM INCLUDING THE PCI

CROSS-REFERENCE TO RELATED APPLICATIONS

This application claims priority under 35 U.S.C. § 119(a) from Indian Patent Application No. 5837/CHE/2014 filed on Nov. 20, 2014, and from Korean Patent Application No. 10-2015-0026426 filed on Feb. 25, 2015, the collective subject matter of which is hereby incorporated by reference.

BACKGROUND

Certain embodiments of the inventive concept relate to Peripheral Component Interconnect (PCI) devices, and more particularly, to PCI devices enabling a PCI host to continuously transmit data via a PCI bus to a memory of the PCI device without additional interaction between the PCI host and the PCI device. Other embodiments of the inventive concept relate to PCI systems including this type of PCI device.

PCI is a local bus standard commonly used to connect the Central Processing Unit (CPU) of a computer system with various peripheral components. PCI express (PCIe), another bus standard that is widely used in contemporary digital systems, defines a high-speed, serial data, computer expansion bus that is intended to largely replace the PCI and PCI extended (PCI-X) bus standards.

Conventionally, a PCI host is allowed to access only a limited memory area according to the size of a base address register (BAR) included in a PCI device. Since a resource allocation error occurs in a PCI BAR when the size of the PCI BAR is set large, the PCI host is allowed to access only limited memory area allocated in small size. In addition, when the PCI host transmits data larger than the PCI BAR size, the PCI host is required to transmit a first part of the data in a size defined by the PCI BAR size, and then transmit a second (e.g., a remaining) part of the data to the PCI device after receiving and processing a transmission completion message associated with the first part and received from the PCI device.

Consequently, some additional interaction between the PCI device and PCI host is required whenever the PCI host transmits an amount of data to the PCI device that is larger than the size of the PCI BAR. Accordingly, system performance related to the transmission of data between the PCI host and PCI device deteriorates.

SUMMARY

Some embodiments of the inventive concept provide a Peripheral Component Interconnect (PCI) device including a unit that enables a PCI host to access a certain memory area in the PCI device by allowing the PCI host to set an offset to the memory area when the PCI host accesses a memory in the PCI device. Other embodiments of the inventive concept provides PCI system including this type of PCI device.

According to some embodiments of the inventive concept, there are provided PCI device including a PCI register including a base address register (BAR) configured to determine a first memory area accessed by a PCI host, an offset register configured to store an offset transmitted from the PCI host, an address translation unit (ATU) configured to detect an operation of the PCI host writing the offset to the offset register and to change an accessed area by the PCI host to a second memory area based on the offset stored in the offset register, and a device memory including the first memory area and the second memory area and configured to store data transmitted from the PCI host and to transmit data stored therein to the PCI host.

The BAR may include a base address. The first memory area may be determined based on the base address and a size of the BAR and the second memory area may be determined based on the base address, the offset, and the size of the BAR. The first memory area may occupy from the base address to an address resulting from adding the base address and the size of the BAR. The second memory area may occupy from an address resulting from adding the base address and the offset to an address obtained by adding the size of the BAR to the address resulting from adding the base address and the offset.

The PCI device may further include a status register configured to store a changed status of the accessed area by the PCI host and an interrupt generator configured to receive the changed status from the status register and to transmit a status signal to the PCI host.

The offset register may be positioned within the PCI register and the ATU may read the offset from the PCI register and change the accessed area by the PCI host to the second memory area based on the offset that has been read.

The data transmitted from the PCI host may include the offset and the ATU may change the accessed area by the PCI host to the second memory area based on the offset included in the data.

According to other embodiments of the inventive concept, there is provided a PCI device including a PCI register including a BAR configured to determine a memory area accessed by a PCI host; an offset register configured to store a first offset and a second offset transmitted from the PCI host; an ATU configured to detect an operation of the PCI host writing the first offset to the offset register and change an accessed area by the PCI host to a first memory area based on the first offset stored in the offset register and to detect an operation of the PCI host writing the second offset to the offset register and change the accessed area by the PCI host to a second memory area based on the second offset stored in the offset register; and a device memory including the first memory area and the second memory area and configured to store data transmitted from the PCI host and to transmit data stored therein to the PCI host.

The first memory area may be determined based on the base address, the first offset, and a size of the BAR. The second memory area may be determined based on the base address, the second offset, and the size of the BAR. The first memory area may occupy from an address resulting from adding the base address and the first offset to an address obtained by adding the size of the BAR to the address resulting from adding the base address and the first offset. The second memory area may occupy from an address resulting from adding the base address and the second offset to an address obtained by adding the size of the BAR to the address resulting from adding the base address and the second offset. The first offset may be different from the second offset.

The PCI device may further include a status register configured to store a changed status of the accessed area by the PCI host and an interrupt generator configured to receive the changed status from the status register and to transmit a status signal to the PCI host.

The offset register may be positioned within the PCI register and the ATU may read the first or second offset from the PCI register and changes the accessed area by the PCI host based on the first or second offset that has been read.

The data transmitted from the PCI host may include the first or second offset and the ATU may change the accessed area by the PCI host based on the first or second offset included in the data.

According to still other embodiments of the inventive concept, a method of controlling the operation of a Peripheral Component Interconnect (PCI) system including a PCI device and a PCI host includes; while writing data from the PCI host to a memory of the PCI device, determining whether a size of the data is greater than a size of a Base Address Register (BAR) of the PCI device, upon determining that the size of the data is greater than the size of the BAR, writing a first offset to an offset register to change a memory area accessed by the PCI host to a first memory area, and writing a first part of the data to the first memory area, and writing a second offset to the offset register to change the first memory area to a second memory area, and writing a second part of the data, different from the first part of the data, to the second memory area.

The offset register may be positioned in a memory area determined by the BAR and the PCI host may write the first or second offset to an offset register within the memory area determined by the BAR.

BRIEF DESCRIPTION OF THE DRAWINGS

The above and other features and advantages of the inventive concept will become more apparent upon consideration of certain detailed embodiments thereof with reference to the attached drawings in which.

DETAILED DESCRIPTION

Figure 1:
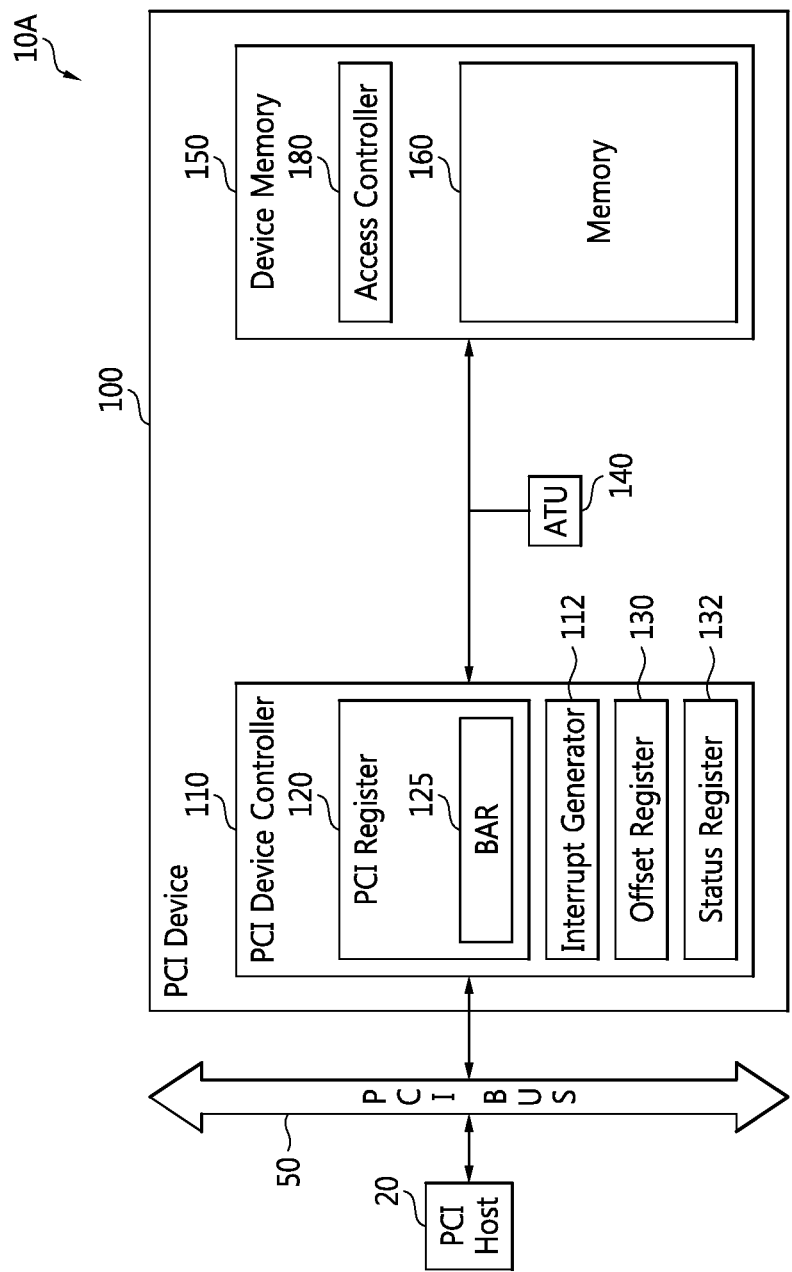
FIGS. 1, 2 and 3 are respective block diagrams illustrating various Peripheral Component Interconnect (PCI) systems according to embodiments of the inventive concept.

The inventive concept now will be described more fully hereinafter with reference to the accompanying drawings in which embodiments of the invention are shown. The inventive concept may, however, be embodied in many different forms and should not be construed as limited to the embodiments set forth herein. Rather, these embodiments are provided so that this disclosure will be thorough and complete, and will fully convey the scope of the invention to those skilled in the art. Throughout the written description and drawings, like reference numbers are used to denote like or similar elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As will be recognized by those skilled in the art, a technical background related to a version (or specification) 3.0 of the Peripheral Component Interconnect (PCI) express (PCIe) standard may be reviewed, for example, at http://www.pcisig.com. The detailed description of embodiments that follows draws upon the terminology and technical background set forth in this specification. Hereafter, references to "PCI" may be construed as referencing PCI, PCI-X and/or PCIe.

FIG. 1 is a block diagram illustrating a PCI system 10A according to embodiments of the inventive concept. The PCI system 10A generally includes a PCI host 20, a PCI bus 50, and a PCI device 100. The PCI system 10A allows the PCI host 20 to write data to and/or read data from the PCI device 100 via the PCI bus 50. The PCI system 10A may be implemented as a computer system or an interface system.

The PCI host 20 may access the PCI device 100 via the PCI bus 50 in order to read data from and/or write data to the PCI device 100. The PCI host 20 may be a root complex.

The PCI bus 50 is connected between the PCI host 20 and the PCI device 100 to enable data communication between the PCI host 20 and PCI device 100. The PCI bus 50 may be a PCIe bus or a PCI-X bus.

The PCI device 100 may include a PCI device controller 110, an address translation unit (ATU) 140, and a device memory 150. The PCI device 100 may communicate with the PCI host 20 via the PCI bus 50, where the PCI device 100 may be implemented as a solid state drive (SSD), a hard disk drive (HDD), a graphics card, or a network interface card (NIC).

In the illustrated example of FIG. 1, the PCI device controller 110 include a PCI register 120 and an offset register 130. The PCI device controller 110 controls the overall functionality of the PCI device 100. The PCI device controller 110 may include a core (not shown) that controls the overall data processing by the PCI device 100, where the PCI register 120 is used to store information characterizing the PCI device 100. In this regard, the PCI host 20 may acquire information about the PCI device 100 from the PCI register 120. In certain embodiments of the inventive concept, the PCI register 120 may include a base address register (BAR) 125.

The BAR 125 may be used to store a base address, and may also be used to store addresses associated with a memory area and/or an input/output (I/O) area of the PCI device 100. In the illustrated embodiments of the inventive concept described herein, it is assumed that the BAR 125 stores a base address associated with a memory area used by the PCI device 100. The base address is a start address of a memory area of the device memory 150 capable of being accessed by the PCI host 20. In other words, the memory area capable of being accessed by the PCI host 20 is determined by the base address. Although only one BAR 125 is shown in FIG. 1, a plurality of BARs may be included in the PCI register 120 in other embodiments of the inventive concept.

The offset register 130 may be used to store an offset transmitted from the PCI host 20. The offset register 130 may be implemented using (e.g.) a register or memory that is separate from the register or memory implementing the PCI register 120 and/or the device memory 150. For example, the offset register 130 may be implemented using a data register, a dynamic random access memory (DRAM), or a static random access memory (SRAM).

In this context, an 'offset' may be understood as a distance between one address and another address. The size of the offset may be restricted by the device memory 150. In other words, the offset may be limited to a size smaller than the device memory 150. The offset may be transmitted by the PCI host 20 together with, or separate from data. In this regard, data and an offset may be transmitted in series, or in parallel.

The PCI device controller 110 may indicate a change of an area that can be accessed by the PCI host 20 into a memory area defined by the offset and may include a status register 132 that indicates updates or changes in status. In addition, the PCI device controller 110 may also include an interrupt generator 112 that generates a changed status signal (or interrupt) in response to a changed status.

The ATU 140 may be used to transmit an update that changes an access area to the PCI host 20 based on a changed status as indicated by the status register 132. Thus, the status register 132 may provide changed status information to the interrupt generator 112, where the interrupt generator 112 may be used to transmit to the PCI host 20 a corresponding changed status interrupt associated with the access area to which access by the PCI host 20 has been allowed.

The ATU 140 may detect execution of an operation by the PCI host 20 that writes an offset to the offset register 130. Upon detecting the writing of an offset, the ATU 140 may change the access area in the device memory 150 in accordance with the offset stored in the offset register 130.

The device memory 150 may receive data from the PCI host 20 and transmit data requested by the PCI host 20 to the PCI host 20. The device memory 150 may include a memory 160 and an access controller 180. The memory 160 may store data from the PCI host 20 and may transmit data requested by the PCI host 20 to the PCI host 20.

The PCI host 20 is allowed to access only a memory area restricted by the size of the BAR 125 in the memory 160. The size of the BAR 125 may be set according to a predetermined standard during a boot (or start-up) stage. The memory 160 includes this memory area having a size determined, at least in part, by the base address of the BAR 125 and the size of the BAR 125. In embodiments of the inventive concept including a plurality of BARs, a corresponding memory area may exist for each one of the plurality of BARs.

The access controller 180 may be used to control the overall operation of the PCI host 20 in accessing the memory 160. The access controller 180 may include a circuit including a plurality of decoders. When the ATU 140 transmits an address of a memory area to the device memory 150, the access controller 180 may control the operation of the PCI host 20 in accessing the memory area corresponding to the address.

Figure 2:
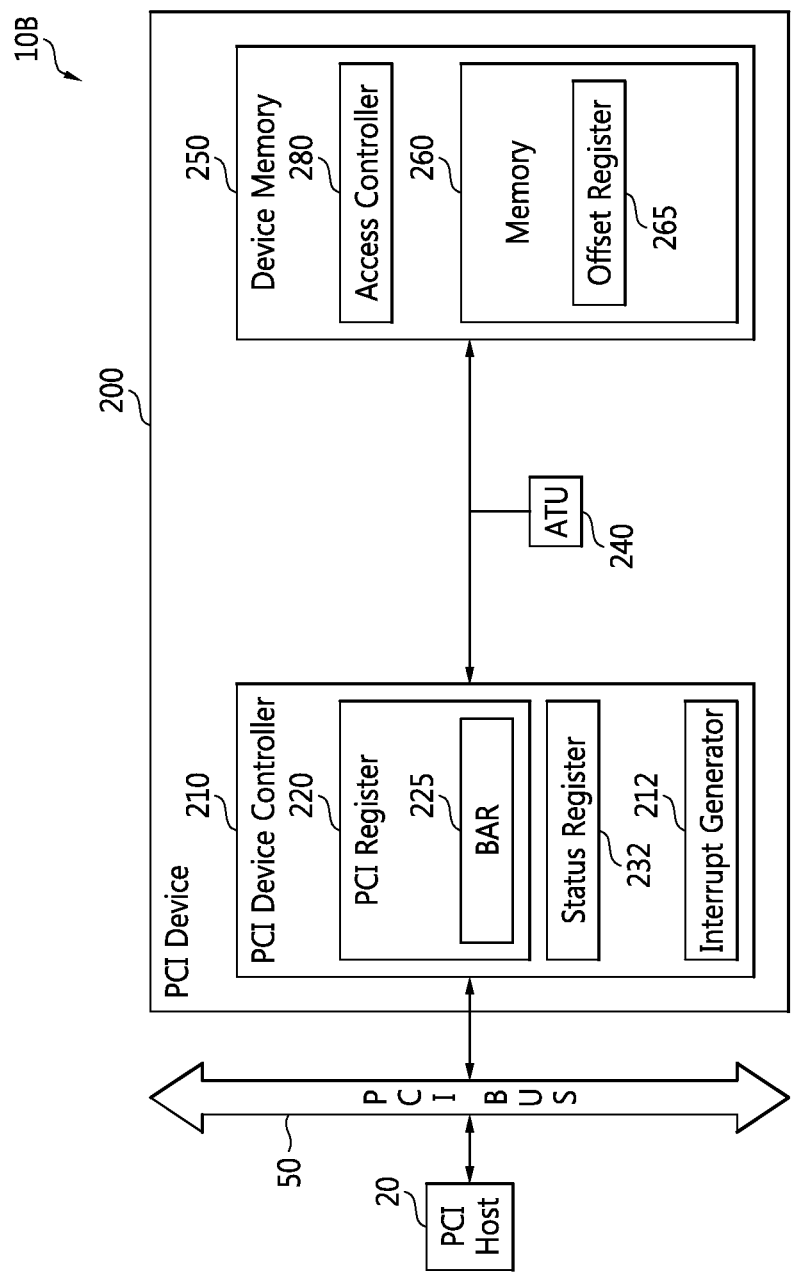

FIG. 2 is a block diagram illustrating a PCI system 10B according to other embodiments of the inventive concept. The PCI system 10B generally includes the PCI host 20, the PCI bus 50, and a PCI device 200. The structure and operation of the PCI system 10B illustrated in FIG. 2 may be substantially similar to that of the PCI system 10A illustrated in FIG. 1, except as noted hereafter.

Thus, the PCI device 200 includes a PCI device controller 210, an ATU 240, and a device memory 250, where the structure and operation of the PCI device controller 210 are substantially similar to those of the PCI device controller 110 illustrated in FIG. 1, except for the omission of the offset register 130.

The PCI device controller 210 include a PCI register 220 that is substantially similar to the PCI register 120 illustrated in FIG. 1, and may a BAR 225 storing a base address. The function of the BAR 225 is substantially similar to that of the BAR 125 illustrated in FIG. 1. Accordingly, the PCI host 20 is allowed to access a memory area as determined by the BAR 225.

Hence, the PCI device controller 210 may indicate a change of an area that can be accessed by the PCI host 20 into a memory area defined by an offset and may include a status register 232 that indicates updates to the status. In addition, the PCI device controller 210 may also include an interrupt generator 212 that generates a changed status interrupt in response to a changed status.

The ATU 240 may transmit a result of changing an access area to the PCI host 20 based on a changed status as indicated by the status register 232. In this regard, the status register 232 may provide changed status information to the interrupt generator 212, and the interrupt generator 212 may transmit to the PCI host 20 a changed status interrupt regarding the access area allowed for the PCI host 20.

The ATU 240 may detect execution of an offset writing an operation by the PCI host 20 directed to the offset register 265 disposed (e.g.) in the device memory 250. Otherwise, the function of the ATU 240 is substantially similar to that of the ATU 140 illustrated in FIG. 1.

The device memory 250 may include a memory 260 and an access controller 280. The function of the device memory 250 is substantially similar to that of the device memory 150 illustrated in FIG. 1. The function of the memory 260 is substantially similar to that of the memory 160 illustrated in FIG. 1. However, the memory 260 may include the offset register 265, unlike the disposition of the memory 160 illustrated in FIG. 1.

However as before, the offset register 265 may store an offset received from the PCI host 20. And although the disposition of the offset register 265 is different from that of the offset register 130 illustrated in FIG. 1, the overall function of the offset register 265 is substantially similar to that of the offset register 130. The PCI host 20 is allowed to access a memory area determined by the BAR 225 within the PCI register 220. The memory area may include a data region and the offset register 265. The data region is a region to which data transmitted from the PCI host 20 is written or a region in which data requested by the PCI host 20 has been stored. As for the memory area determined by the BAR 225, it is not necessary that the data region and the offset register 265 be physically continuous space. The function of the access controller 280 is substantially similar to that of the access controller 180 illustrated in FIG. 1.

Figure 3:
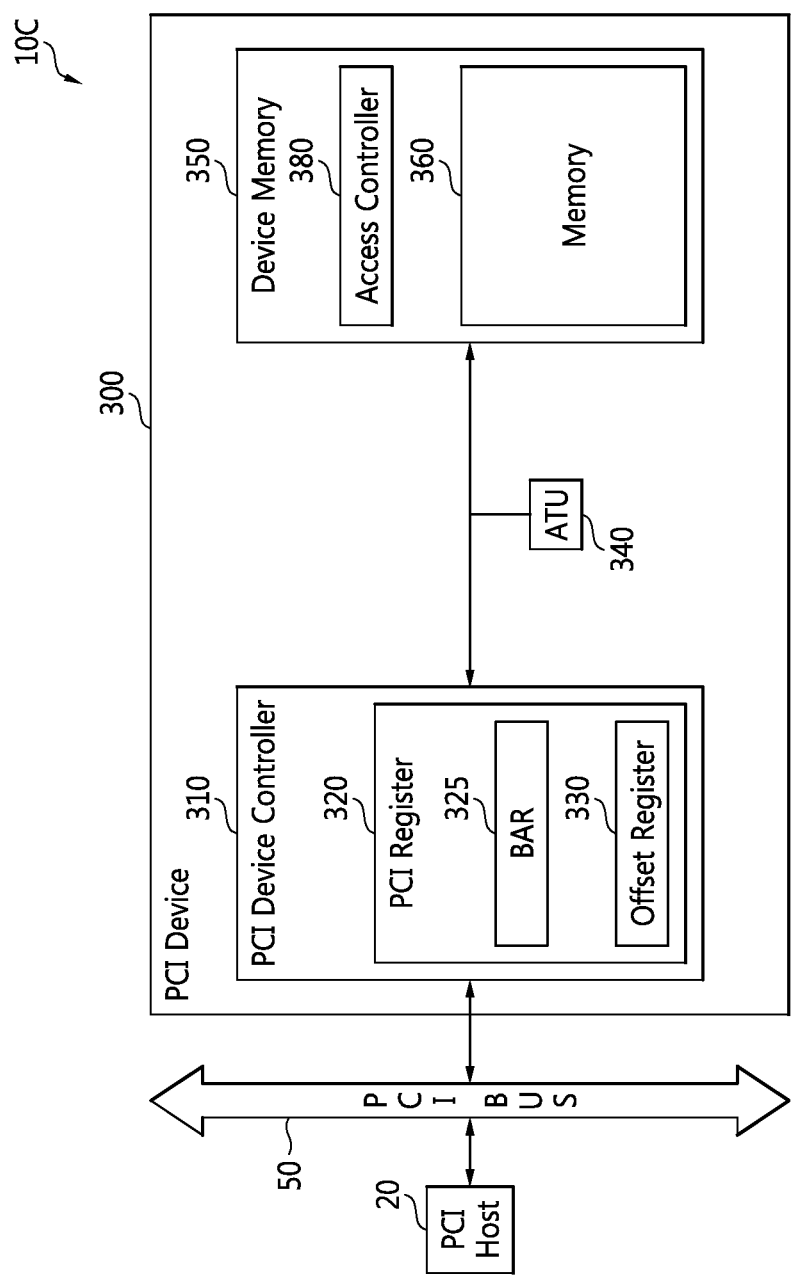

FIG. 3 is a block diagram illustrating a PCI system 10C according to still other embodiments of the inventive concept. The PCI system 10C generally includes the PCI host 20, the PCI bus 50, and a PCI device 300. The function of the PCI system 10C illustrated in FIG. 3 may be substantially similar to that of the PCI system 10A illustrated in FIG. 1, except as descried hereafter in relation to the PCI device 300.

The PCI device 300 may include a PCI device controller 310, an ATU 340, and a device memory 350. Apart from the disposition of an offset register 330, the structure and operation of the PCI device 300 illustrated in FIG. 3 are substantially similar to those of the PCI device 100 illustrated in FIG. 1.

Thus, the PCI device controller 310 may be substantially similar to the PCI device controller 110 illustrated in FIG. 1, except for the disposition of the offset register 330 in a PCI register 320. The offset register 330 may be disposed in a different region of the PCI register 320 than a BAR 325, however the structure and function of the offset register 330 may be substantially similar to that of the offset registers 130 and 230 illustrated in FIGS. 1 and 2.

Using various operations for changing an offset, as illustrated by way of example in FIGS. 4, 5, 6, 7, 8 and 9, first data (DATA1) is a first part of data to be transmitted by the PCI host 20 and second data (DATA2) is a second or remaining part of the data not transmitted as first data, but still constituting data that the PCI host 20 intends to transmit. As previously noted, the PCI host 20 may transmit an offset together with, or separate from the data, in series or parallel with the data.

Figure 4:
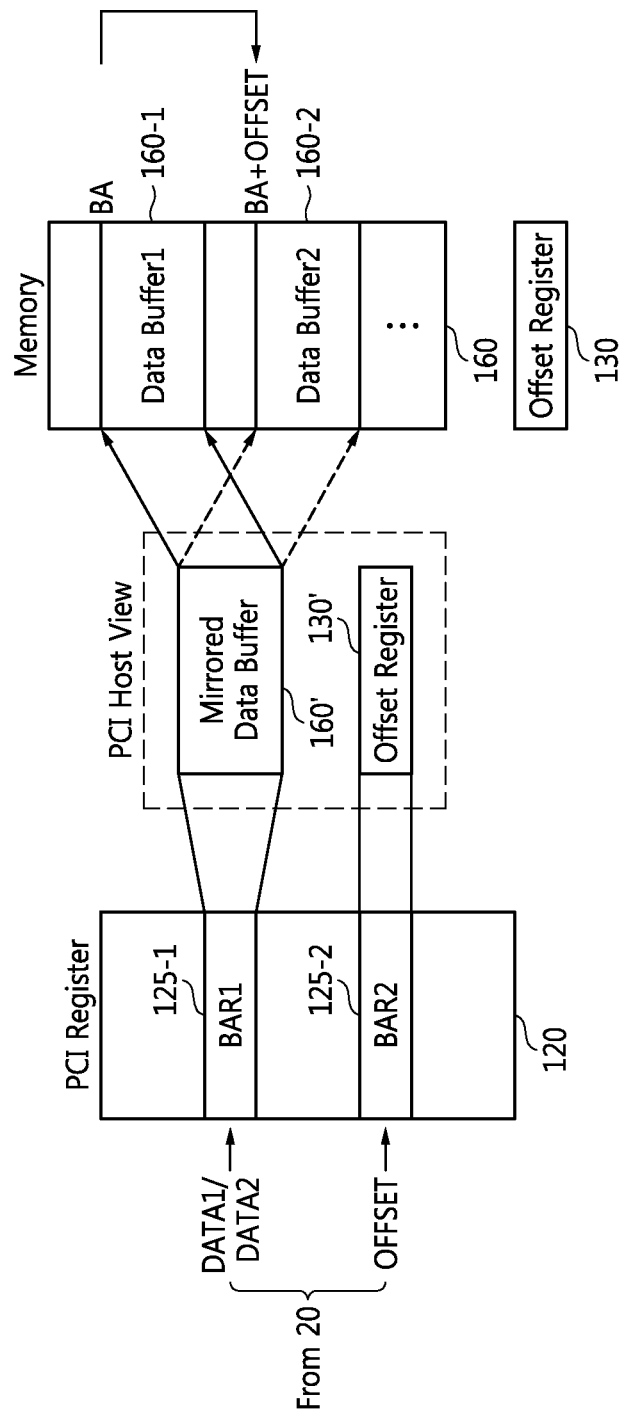
FIGS. 4, 5, 6, 7, 8 and 9 are respective conceptual diagrams illustrating various operations in which a PCI host changes an offset and/or an access area of a PCI device in a PCI system like the PCI systems of FIGS. 1, 2 and/or 3.

FIG. 4 is a conceptual diagram illustrating an operation in which the PCI host 20 changes an offset and/or an access area of the PCI device 100 in the context of the PCI system 10A of FIG. 1. Referring to FIGS. 1 and 4, a first data buffer 160-1 is determined based on a base address BA of a first BAR 125-1, where the first data buffer 160-1 occupies memory locations extending from the base address BA of the first BAR 125-1 to an address derived by adding the base address BA and the size of the first BAR 125-1.

In contrasts, a second data buffer 160-2 is determined based on the base address BA of the first BAR 125-1 and an offset (OFFSET), where the second data buffer 160-2 may occupy memory locations extending from an address derived by adding the base address BA of the first BAR 125-1 and the offset, and then also adding the size of the first BAR 125-1 to the address resulting from adding the base address BA and the offset.

The PCI host 20 may transmit the first data DATA1 to the memory 160 through the first BAR 125-1 included in the PCI register 120. For instance, the PCI host 20 may write the first data DATA1 to the first data buffer 160-1 involving the base address BA stored in the first BAR 125-1.

To transmit the second data DATA2 to the second data buffer 160-2, the PCI host 20 may write the offset in the offset register 130 through a second BAR 125-2. The second BAR 125-2 may store a base address for an offset register 130 and the PCI host 20 may write the offset to the offset register 130 based on the base address stored in the second BAR 125-2. While viewing the first data buffer 160-1 through the first BAR 125-1, the PCI host 20 may write the offset to the offset register 130.

The ATU 140 may mirror a data buffer space 160' viewed by the PCI host 20 to a position of the second data buffer 160-2 using the offset written to the offset register 130. In other words, the ATU 140 may change the position of the first data buffer 160-1 to the position of the second data buffer 160-2, where the offset register 130' is the offset register 130, as viewed by PCI host 20.

After the ATU 140 mirrors the data buffer space 160' viewed by the PCI host 20 to the position of the second data buffer 160-2, the PCI host 20 may write the second data DATA2 to the second data buffer 160-2. When the size of data to be transmitted by the PCI host 20 is larger than the size of the BAR 125, the PCI host 20 cannot transmit all of the data in a single data transmission operation. However, according to the above-described operation, the PCI host 20 may write the offset (OFFSET) to the offset register 130 and transmit a block of data having a size larger than the BAR 125 to a certain area of the memory 160 without a special or additional interaction between the PCI host and PCI device.

Figure 5:
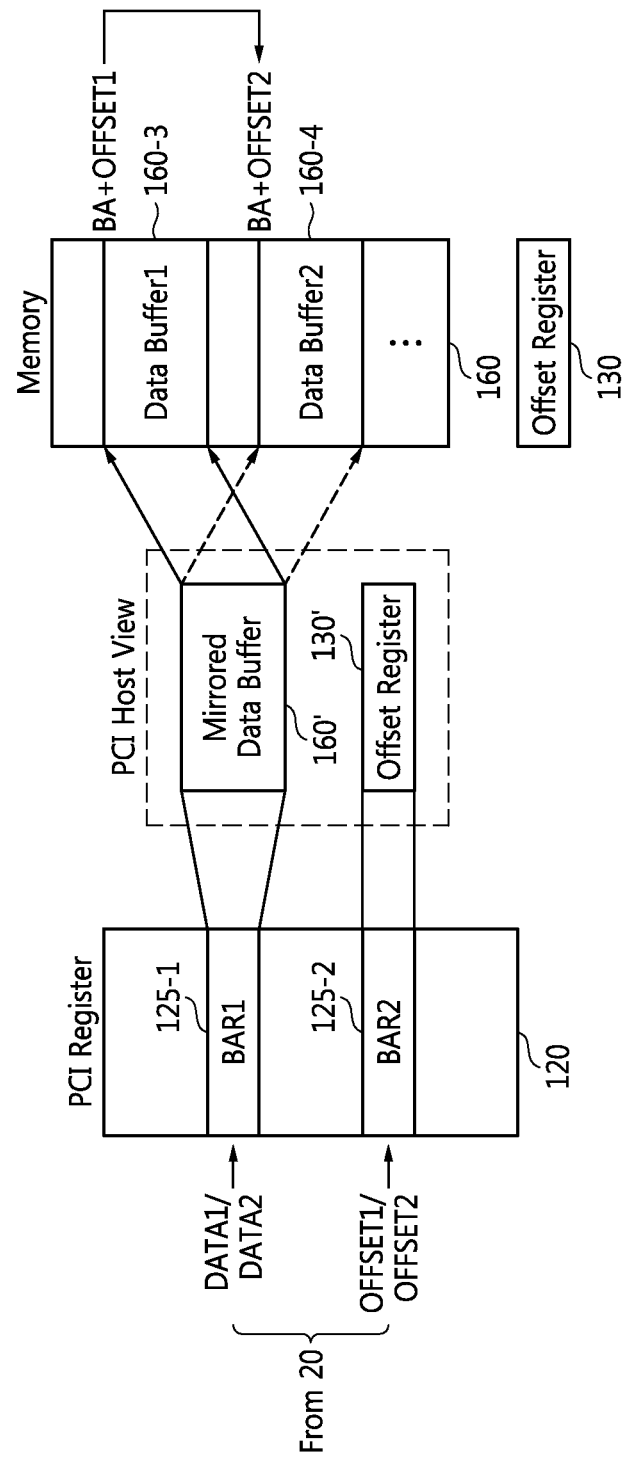

FIG. 5 is a conceptual diagram illustrating an operation in which the PCI host 20 changes an offset and/or an access area of the PCI device 100 in the PCI system 10A of FIG. 1. The operation illustrated in FIG. 5 is substantially similar to that of the operation illustrated in FIG. 4, except as noted hereafter.

Referring to FIGS. 1 and 5, a first data buffer 160-3 is determined based on the base address BA of the first BAR 125-1 and a first offset (OFFSET1). The first data buffer 160-3 may occupy memory locations extending from an address derived by adding the base address BA of the first BAR 125-1 and the first offset to an address resulting from adding the size of the first BAR 125-1 to the address resulting from adding the base address BA and the first offset.

A second data buffer 160-4 is determined based on the base address BA of the first BAR 125-1 and a second offset (OFFSET2). The second data buffer 160-4 may occupy memory locations extending from an address derived by adding the base address BA of the first BAR 125-1 and the second offset to an address resulting from adding the size of the first BAR 125-1 to the address resulting from adding the base address BA and the second offset.

To transmit the first data (DATA1) to the first data buffer 160-3, the PCI host 20 may write the first offset (OFFSET1) to the offset register 130. The ATU 140 may detect an operation of the PCI host 20 writing the first offset to the offset register 130 and may mirror the data buffer space 160' viewed by the PCI host 20 to a position of the first data buffer 160-3 using the first offset written to the offset register 130. In this manner, the ATU 140 may change an area that the PCI host 20 is allowed to access to the position of the first data buffer 160-3. After the ATU 140 mirrors the data buffer space 160' viewed by the PCI host 20 to the position of the first data buffer 160-3, the PCI host 20 may write the first data DATA1 to the first data buffer 160-3. The offset register 130' is the offset register 130, as viewed by PCI host 20.

To transmit the second data (DATA2) to the second data buffer 160-4, the PCI host 20 may write the second offset (OFFSET2) to the offset register 130. The ATU 140 may detect the execution of an operation by the PCI host 20 writing the second offset to the offset register 130, and may mirror the data buffer space 160' viewed by the PCI host 20 to a position of the second data buffer 160-4 using the second offset written to the offset register 130. In this manner, the ATU 140 may change the position of the first data buffer 160-3 to the position of the second data buffer 160-4. After the ATU 140 mirrors the data buffer space 160' viewed by the PCI host 20 to the position of the second data buffer 160-4, the PCI host 20 may write the second data DATA2 to the second data buffer 160-4.

Figure 6:
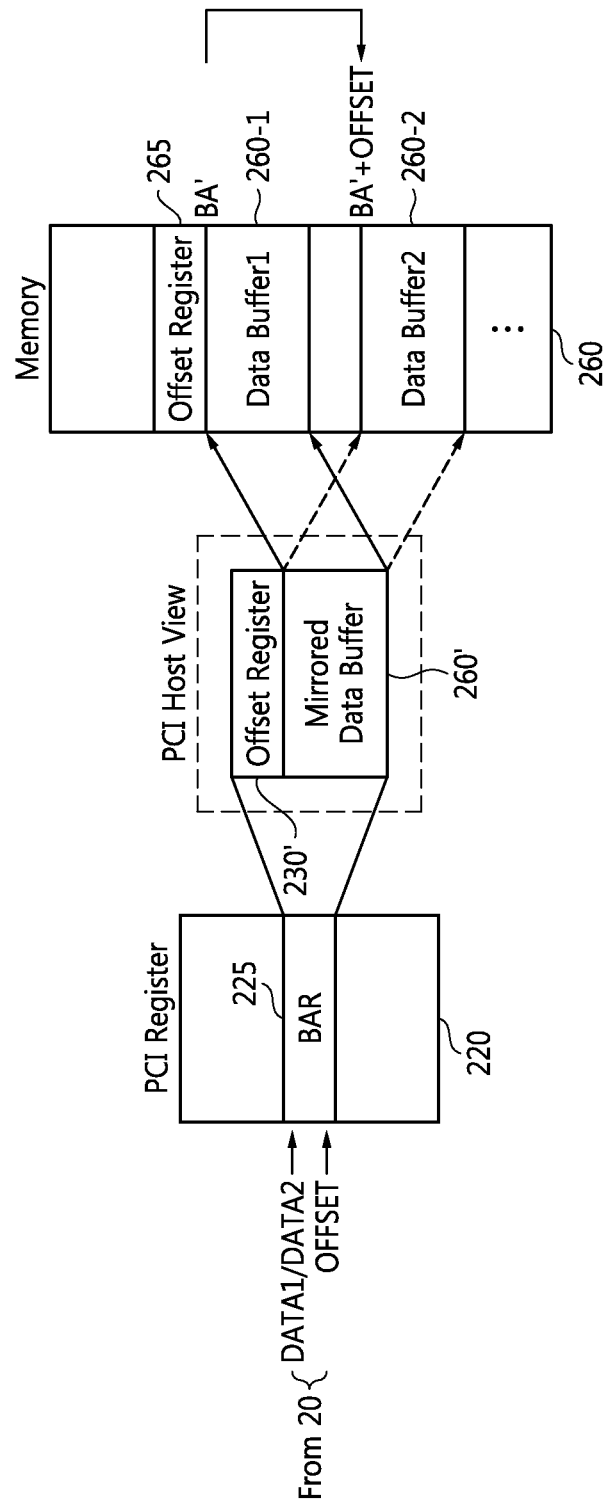

FIG. 6 is a conceptual diagram illustrating an operation in which the PCI host 20 changes an offset and/or changes an access area of the PCI device 200 in the PCI system 10B of FIG. 2. Referring to FIGS. 2 and 6, the PCI host 20 may transmit the first data DATA1 to the memory 260 of the PCI device 200 through the BAR 225 included in the PCI register 220. For instance, the PCI host 20 may write the first data DATA1 to a first data buffer 260-1 involved with the base address BA stored in the BAR 225.

The first data buffer 260-1 may be a memory area that occupies memory locations extending from a base address BA' to an address derived by adding the base address BA' and the size of the BAR 225 in the memory 260. The base address BA' may be an address obtained by adding the size of the offset register 265 to the base address BA involved with the BAR 225.

To transmit the second data DATA2 to the second data buffer 260-2, the PCI host 20 may write the offset (OFFSET) to the offset register 265 via the BAR 225. The BAR 225 may store a base address for the offset register 265 and the PCI host 20 may write the offset to the offset register 265 based on the base address BA stored in the BAR 225.

The second data buffer 260-2 may be a memory area that occupies from an address obtained by adding the base address BA' and the offset to an address obtained by adding the size of the BAR 225 to the address obtained by adding the base address BA' and the offset the memory 260. The base address BA' may be an address resulting from adding the size of the offset register 265 to the base address BA involved with the BAR 225.

While viewing the first data buffer 260-1 through the BAR 225, the PCI host 20 may write the offset to the offset register 265. The ATU 240 may mirror a data buffer space 260' viewed by the PCI host 20 to a position of the second data buffer 260-2. In this manner, the ATU 240 may change the position of the first data buffer 260-1 to the position of the second data buffer 260-2. The offset register 230' is the offset register 265 viewed by PCI host 20.

After the ATU 240 mirrors the data buffer space 260' to the position of the second data buffer 260-2, the PCI host 20 may write the second data DATA2 to the second data buffer 260-2.

Figure 7:
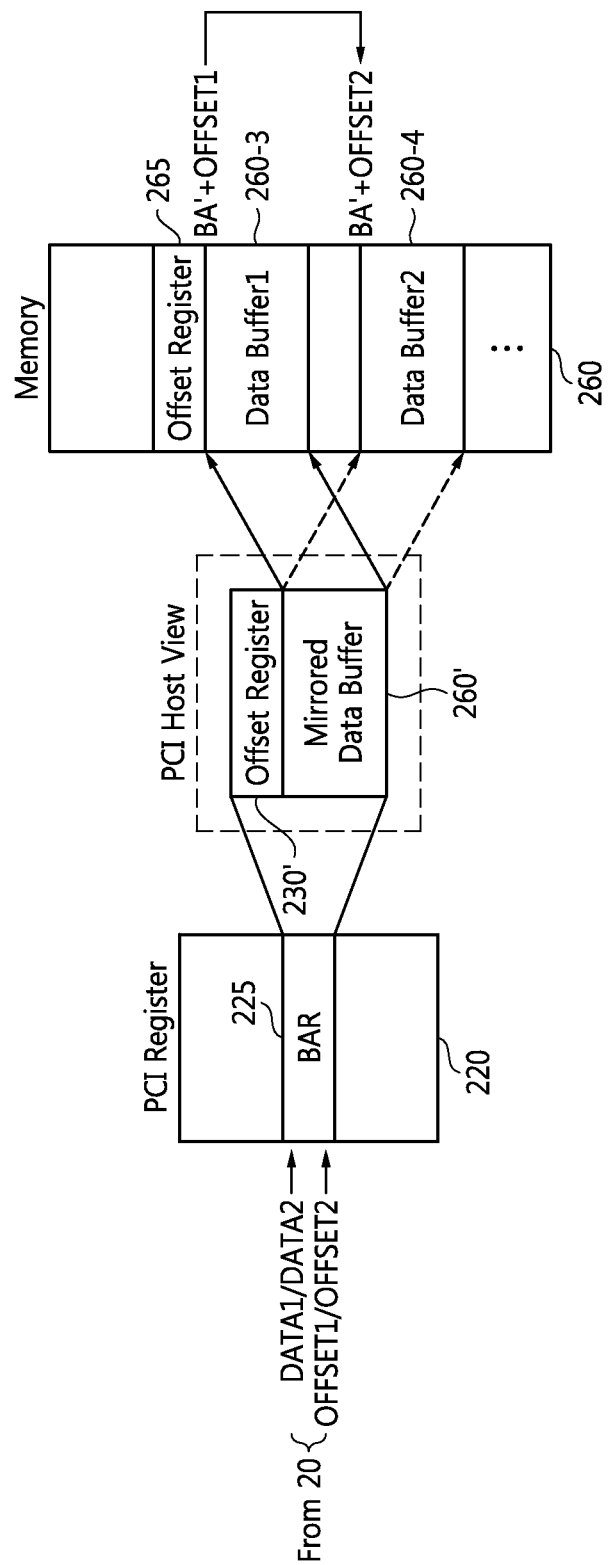

FIG. 7 is a conceptual diagram illustrating an operation in which the PCI host 20 changes an offset and/or changes an access area of the PCI device 200 in the PCI system 10B of FIG. 2. Referring to FIGS. 2 and 7, the first data buffer 260-3 is determined based on the base address BA' of the BAR 225 and the first offset (OFFSET1). The first data buffer 260-3 may occupy memory addresses extending from an address derived by adding the first offset and the base address BA' of the BAR 225 to an address resulting from adding the size of the BAR 225 and the address resulting from adding the first offset and the base address BA'. The base address BA' may be an address obtained by adding the size of the offset register 265 and the base address BA involved with the BAR 225.

The second data buffer 260-4 is determined based on the base address BA' of the BAR 225 and a second offset (OFFSET2). The second data buffer 260-4 may occupy memory locations extending from an derived by adding the second offset and the base address BA' of the BAR 225 to an address resulting from adding the size of the BAR 225 and the address resulting from adding the second offset and the base address BA'.

To transmit the first data DATA1 to the first data buffer 260-3, the PCI host 20 may write the first offset to the offset register 265. In response, the ATU 240 detects the execution of the offset writing operation of the PCI host 20 that writes the first offset (OFFSET1) to the offset register 265, and mirrors the data buffer space 260' viewed by the PCI host 20 to the position of the first data buffer 260-3 using the first offset written to the offset register 265. In this manner, the ATU 240 may change an area that the PCI host 20 is allowed to access to the position of the first data buffer 260-3. After the ATU 240 mirrors the data buffer space 260' viewed by the PCI host 20 to the position of the first data buffer 260-3, the PCI host 20 may write the first data DATA1 to the first data buffer 260-3. The offset register 230' is the offset register 265, as viewed by PCI host 20.

To transmit the second data DATA2 to the second data buffer 260-4, the PCI host 20 may write the second offset (OFFSET2) to the offset register 265. Here again, the ATU 240 may detect the execution of the offset writing operation of the PCI host 20 that writes the second offset to the offset register 265, and mirrors the data buffer space 260' viewed by the PCI host 20 to the position of the second data buffer 260-4 using the second offset written to the offset register 265. In this manner, the ATU 240 may change the position of the first data buffer 260-3 to the position of the second data buffer 260-4. After the ATU 240 mirrors the data buffer space 260' viewed by the PCI host 20 to the position of the second data buffer 260-4, the PCI host 20 may write the second data DATA2 to the second data buffer 260-4.

Figure 8:
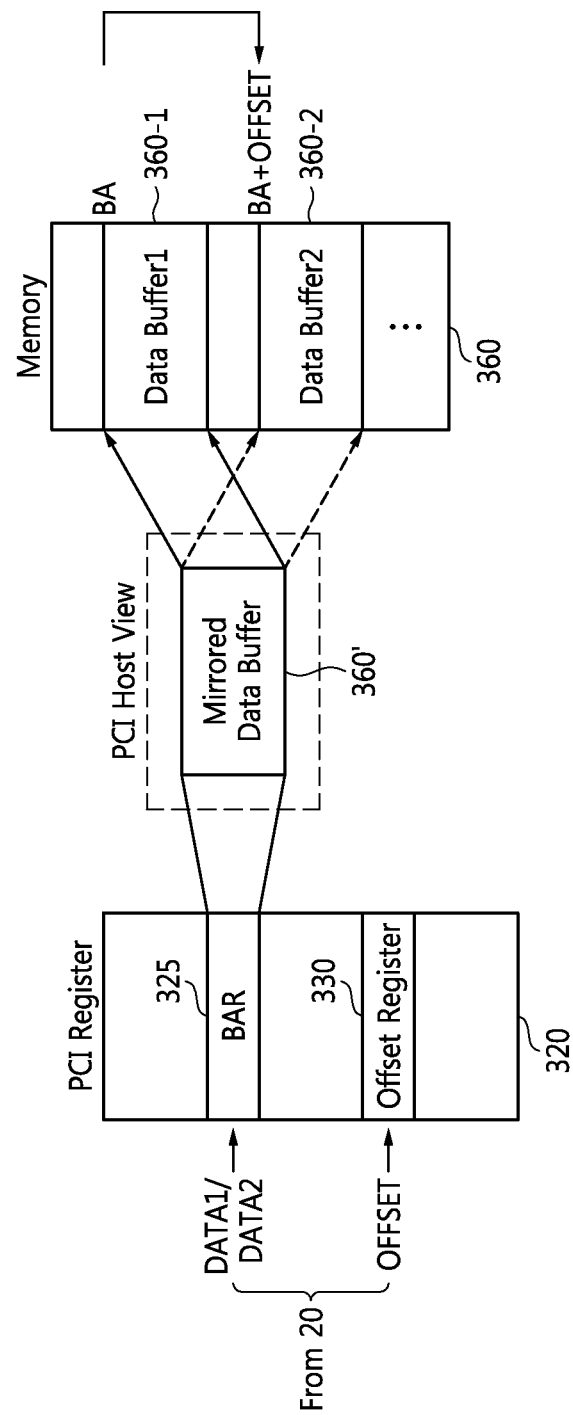

FIG. 8 is a conceptual diagram illustrating an operation in which the PCI host 20 changes an offset and changes an access area of the PCI device 300 in the PCI system 10C of FIG. 3. Referring to FIGS. 3 and 8, the PCI host 20 may transmit the first data DATA1 to the memory 360 of the PCI device 300 through the BAR 325 included in the PCI register 320. For instance, the PCI host 20 may write the first data DATA1 to a first data buffer 360-1 involved with the base address BA stored in the BAR 325. The first data buffer 360-1 may be a memory area that occupies from the base address BA to an address resulting from adding the size of the BAR 325 and the base address BA in the memory 360.

To transmit the second data DATA2 to the second data buffer 360-2, the PCI host 20 may write the offset (OFFSET) to the offset register 330 included in the PCI register 320. The second data buffer 360-2 may be a memory area that occupies memory locations extending from an address obtained by adding the offset and the base address BA to an address obtained by adding the size of the BAR 325 and the address obtained by adding the offset and the base address BA in the memory 360.

While viewing the first data buffer 360-1 through the BAR 325, the PCI host 20 may write the offset (OFFSET) to the offset register 330. The ATU 340 may mirror a data buffer space 360' viewed by the PCI host 20 to a position of the second data buffer 360-2. In other words, the ATU 340 may change the position of the first data buffer 360-1 to the position of the second data buffer 360-2. After the ATU 340 mirrors the data buffer space 360' to the position of the second data buffer 360-2, the PCI host 20 may write the second data DATA2 to the second data buffer 360-2.

Figure 9:
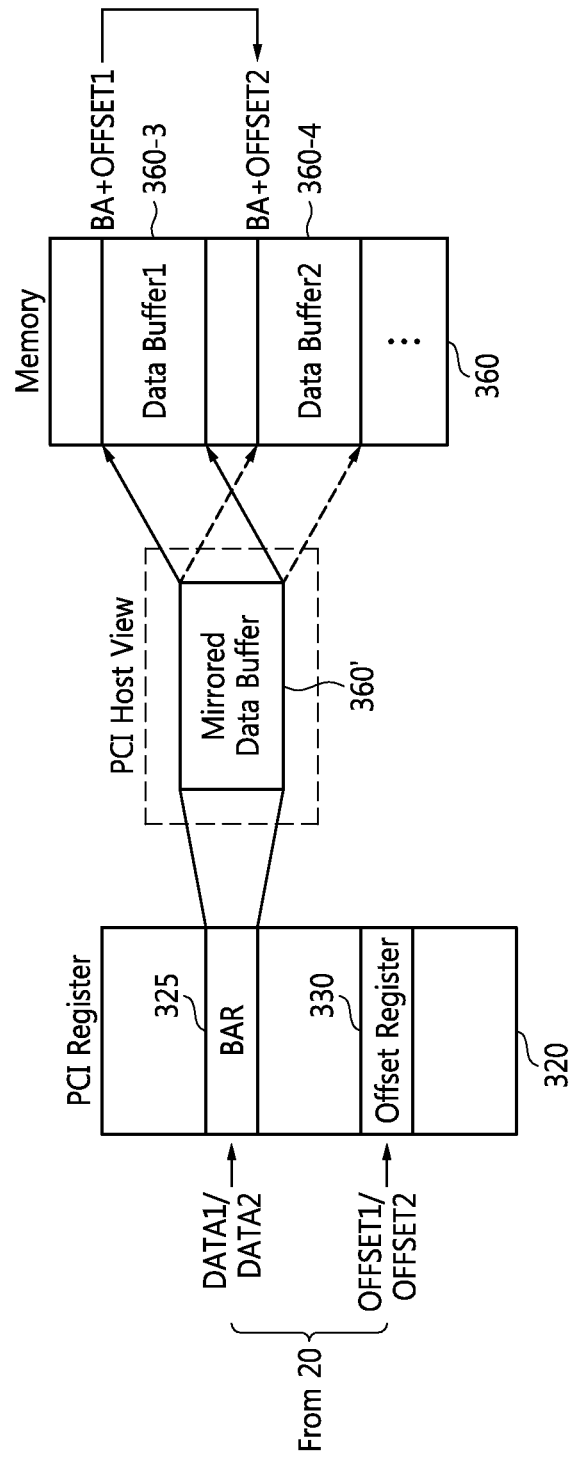

FIG. 9 is a conceptual diagram illustrating an operation in which the PCI host 20 changes an offset and changes an access area of the PCI device 300 in the PCI system 10C of FIG. 3. Referring to FIGS. 3 and 9, the first data buffer 360-3 is determined based on the base address BA of the BAR 325 and the first offset (OFFSET1). The first data buffer 360-3 may occupy memory locations extending from an address resulting from adding the base address BA of the BAR 325 and the first offset to an address resulting from adding the address resulting from adding the base address BA and the first offset and the size of the BAR 325.

The second data buffer 360-4 is determined based on the base address BA of the BAR 325 and a second offset (OFFSET2). The second data buffer 360-4 may occupy memory locations from an address resulting from adding the base address BA of the BAR 325 and the second offset to an address resulting from adding the address resulting from adding the base address BA and the second offset and the size of the BAR 325.

To transmit the first data DATA1 to the first data buffer 360-3, the PCI host 20 may write the first offset to the offset register 330. The ATU 340 may detect an operation of the PCI host 20 writing the first offset to the offset register 330 and may mirror the data buffer space 360' viewed by the PCI host 20 to the position of the first data buffer 360-3 using the first offset written to the offset register 330. In other words, the ATU 340 may change an area that the PCI host 20 is allowed to access to the position of the first data buffer 360-3. After the ATU 340 mirrors the data buffer space 360' viewed by the PCI host 20 to the position of the first data buffer 360-3, the PCI host 20 may write the first data DATA1 to the first data buffer 360-3.

To transmit the second data DATA2 to the second data buffer 360-4, the PCI host 20 may write the second offset to the offset register 330. The ATU 340 may detect an operation of the PCI host 20 writing the second offset to the offset register 330 and may mirror the data buffer space 360' viewed by the PCI host 20 to the position of the second data buffer 360-4 using the second offset written to the offset register 330. In other words, the ATU 340 may change the position of the first data buffer 360-3 to the position of the second data buffer 360-4. After the ATU 340 mirrors the data buffer space 360' viewed by the PCI host 20 to the position of the second data buffer 360-4, the PCI host 20 may write the second data DATA2 to the second data buffer 360-4.

The operations in which the PCI host 20 changes an offset (e.g., OFFSET, OFFSET1, and/or OFFSET2) and accordingly changes an access area of a memory in the PCI device 100, 200, or 300 have been described with reference to FIGS. 4, 5, 6, 7, 8 and 9. Although only examples using a single offset, first and second offsets, as well as first/second data, and first/second data buffers have been described above with reference to FIGS. 4, 5, 6, 7, 8 and 9, the PCI host 20 may transmit any reasonable number of offsets associated with the transfer of data via multiple data buffers.

Figure 10:
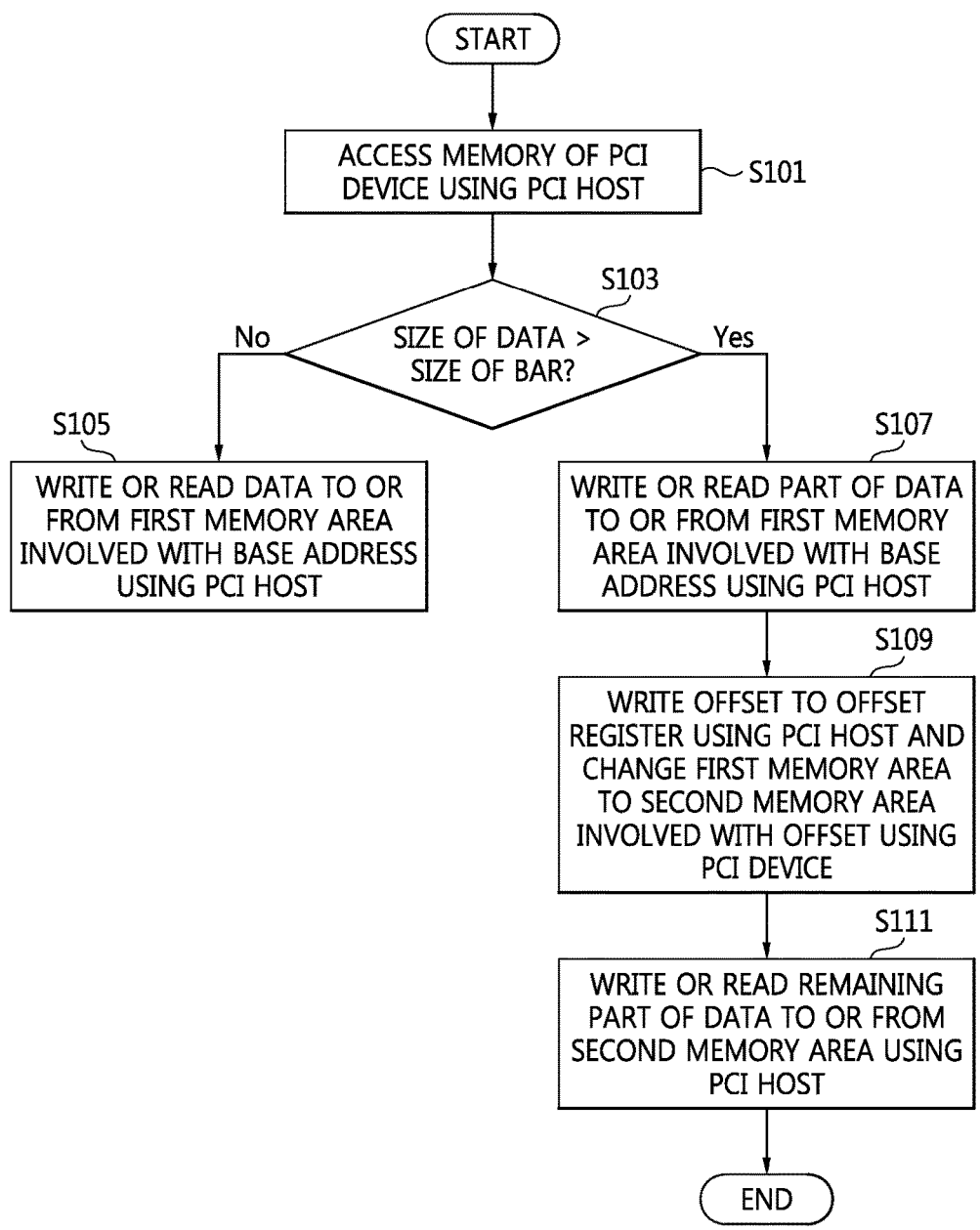
FIG. 10 is a flowchart summarizing a method of changing an offset and/or accessing the PCI device using a PCI host consistent with the conceptual descriptions of FIGS. 4, 6, and 8.

FIG. 10 is a flowchart summarizing a method of changing an offset and accessing the PCI device 100, 200, or 300 using the PCI host 20 as illustrated in FIGS. 4, 6, and 8. Referring to FIGS. 4, 6, 8, and 10, the operations changing an offset and accessing the PCI devices 100, 200, and 300, respectively, using the PCI host 20 are substantially similar, except for the various dispositions of the respective offset registers 130, 265, and 330.

The PCI host 20 accesses the memory 160, 260, or 360 of the PCI device 100, 200, or 300 in operation S101. That is, the PCI host 20 may access the memory 160, 260, or 360 of the PCI device 100, 200, or 300 and may write data to the memory 160, 260, or 360 or read data from the memory 160, 260, or 360.

When the size of the data is smaller than the size of the BAR 125, 225, or 325 of the PCI device 100, 200, or 300 in operation S103, the PCI host 20 may write the data to or read the data from the first memory area 160-1, 260-1, or 360-1 involved with the base address BA or BA' of the BAR 125, 225, or 325 in operation S105.

When the size of the data is larger than the size of the BAR 125, 225, or 325 of the PCI device 100, 200, or 300 in operation S103, the PCI host 20 may write or read a part of the data, the size of which does not exceed the size of the BAR 125, 225, or 325, to or from the first memory area 160-1, 260-1, or 360-1 in operation S107.

In order to transmit the remaining part of the data to the memory 160, 260, or 360, the PCI host 20 may write an offset to the offset register 130, 265, or 330 and the ATU 140, 240, or 340 may change the first memory area 160-1, 260-1, or 360-1 to the second memory area 160-2, 260-2, or 360-2 using the offset in operation S109. The PCI device 100, 200, or 300 may check on the change of the first memory area 160-1, 260-1, or 360-1.

The PCI host 20 may write or read the remaining part of the data to or from the second memory area 160-2, 260-2, or 360-2 in operation S111. After checking on the change of the second memory area 160-2, 260-2, or 360-2, the PCI host 20 may access the second memory area 160-2, 260-2, or 360-2.

When the remaining part of the data is larger than the size of the BAR 125, 225, or 325, a part of the remaining part of the data, which does not exceed the size of the BAR 125, 225, or 325, may be transmitted. As described above, the PCI host 20 may write a new offset to the offset register 130, 265, or 330 and the ATU 140, 240, or 340 may change the access area to a third memory area using the new offset. The PCI host 20 may transmit a remnant of the data, which has not been transmitted, to the third memory area.

Figure 11:
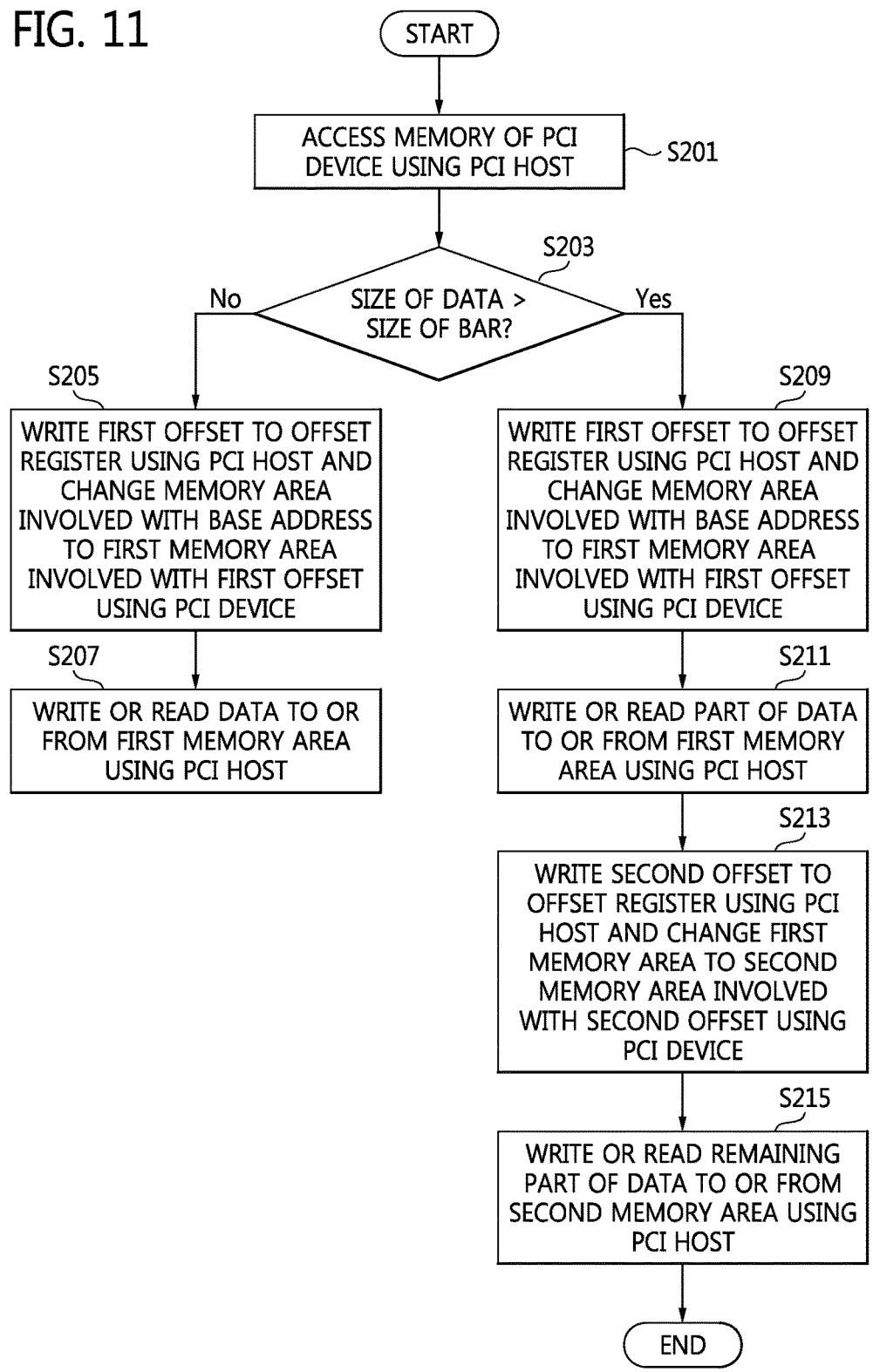
FIG. 11 is a flowchart summarizing a method of changing an offset and/or accessing the PCI device using the PCI host consistent with the conceptual descriptions of FIGS. 5, 7, and 9.

FIG. 11 is a flowchart summarizing a method of changing an offset and accessing the PCI device 100, 200, or 300 using the PCI host 20 as illustrated in FIGS. 5, 7, and 9. Referring to FIGS. 5, 7, 9, and 11, the operations changing an offset and accessing the PCI devices 100, 200, and 300, respectively, using the PCI host 20 are substantially the same as or similar to one another, except for the different positions of the respective offset registers 130, 265, and 330.

The PCI host 20 accesses the memory 160, 260, or 360 of the PCI device 100, 200, or 300 in operation S201. In detail, the PCI host 20 may access the memory 160, 260, or 360 of the PCI device 100, 200, or 300 and may write data to the memory 160, 260, or 360 or read data from the memory 160, 260, or 360.

When the size of the data is smaller than the size of the BAR 125, 225, or 325 of the PCI device 100, 200, or 300 in operation S203, the PCI host 20 may write the first offset OFFSET1 to the offset register 130, 265, or 330 and the ATU 140, 240, or 340 may change a memory area involved with the base address BA or BA' to the first memory area 160-3, 260-3, or 360-3 involved with the first offset OFFSET1 in operation S205. The PCI device 100, 200, or 300 may check on the change of the first memory area 160-3, 260-3, or 360-3.

The PCI host 20 may write or read the data to or from the first memory area 160-3, 260-3, or 360-3 in operation S207. After checking on the change of the first memory area 160-3, 260-3, or 360-3, the PCI host 20 may access the first memory area 160-3, 260-3, or 360-3.

When the size of the data is larger than the size of the BAR 125, 225, or 325 of the PCI device 100, 200, or 300 in operation S203, the PCI host 20 may write the first offset OFFSET1 to the offset register 130, 265, or 330 and the ATU 140, 240, or 340 may change a memory area involved with the base address BA or BA' to the first memory area 160-3, 260-3, or 360-3 involved with the first offset OFFSET1 in operation S209. The PCI device 100, 200, or 300 may check on the change of the first memory area 160-3, 260-3, or 360-3.

The PCI host 20 may write or read a part of the data, which does not exceed the size of the BAR 125, 225, or 325, to or from the first memory area 160-3, 260-3, or 360-3 in operation S211. After checking on the change of the first memory area 160-3, 260-3, or 360-3, the PCI host 20 may access the first memory area 160-3, 260-3, or 360-3.

The PCI host 20 may write the second offset OFFSET2 to the offset register 130, 265, or 330 and the ATU 140, 240, or 340 may change the first memory area 160-3, 260-3, or 360-3 to the second memory area 160-4, 260-4, or 360-4 using the second offset OFFSET2 in operation S213. The PCI host 20 may write or read the remaining part of the data to or from the second memory area 160-4, 260-4, or 360-4 in operation S215. After checking on the change of the second memory area 160-4, 260-4, or 360-4, the PCI host 20 may access the second memory area 160-4, 260-4, or 360-4.

Figure 12:
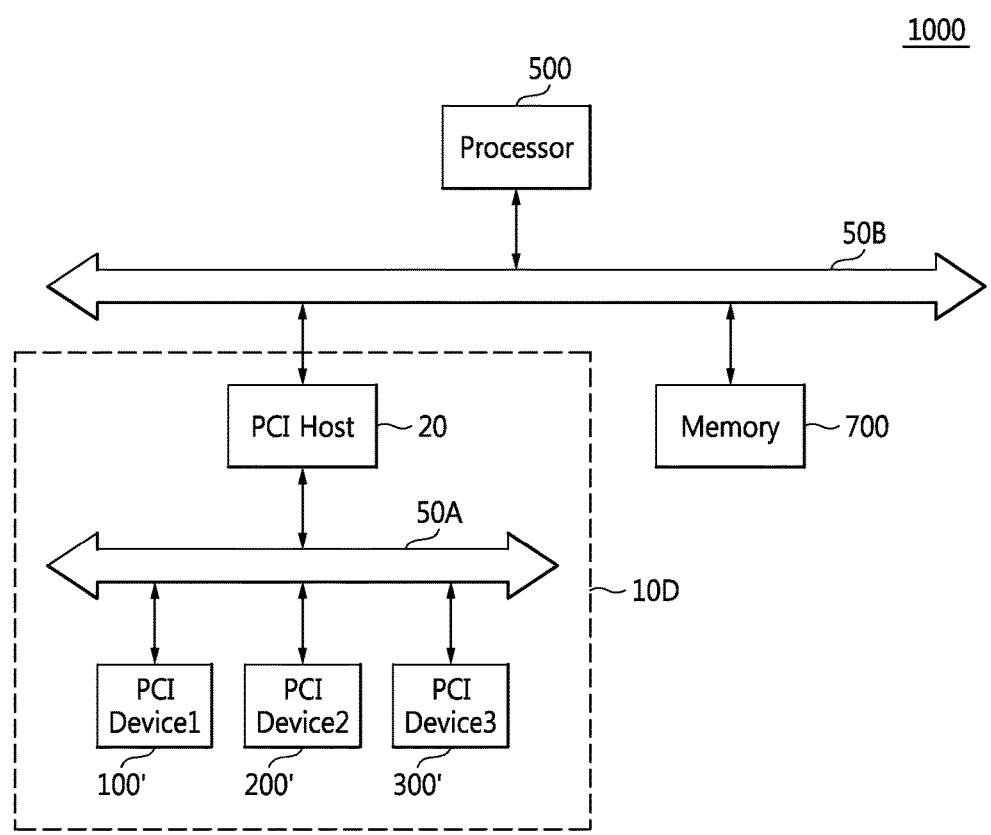
FIG. 12 is a general block diagram illustrating a computer system according to certain embodiments of the inventive concept.

FIG. 12 is a general block diagram of a computer system 1000 according to embodiments of the inventive concept. Referring to FIGS. 1, 2, 3 and 12, the computer system 1000 may include a PCI system 10D, a system bus 50B, a processor 500, and a system memory 700.

The computer system 1000 may be a system combining a central processing unit (CPU) and peripheral components such as memory, input/output devices, a disk driver, and a printer using PCI interface. The computer system 1000 may be a person computer (PC) or a laptop computer but is not restricted thereto. The PCI system 10D may have structure and function substantially the same as or similar to the PCI system 10A, 10B, or 10C described with reference to FIGS. 1 through 11.

The PCI system 10D may include the PCI host 20, a PCI bus 50A, a first PCI device 100', a second PCI device 200', and a third PCI device 300'. The PCI host 20 and the PCI bus 50A are substantially the same as the PCI host 20 and the PCI bus 50 illustrated in FIGS. 1 through 3.

Although the PCI system 10D includes the first PCI device 100', the second PCI device 200', and the third PCI device 300' in the embodiments illustrated in FIG. 12, the PCI system 10D may include at least one PCI device. Each of the PCI devices 100', 200', and 300' may be one among the PCI devices 100, 200, and 300 respectively illustrated in FIGS. 1 through 3. Each of the PCI devices 100', 200', and 300' may be an SSD, a universal flash storage (UFS), an HDD, a video graphics adapter (VGA) card, a sound adapter card, or an NIC but is not restricted thereto.

The processor 500, the system memory 700 and the PCI system 10D may be connected with each other via the system bus 50B. The system bus 50B may include at least one among a control bus, an address bus, and a data bus. The processor 500 may control the operation of the computer system 1000 and may control the operation of at least one of the PCI devices 100', 200', and 300' through the PCI host 20.

The system memory 700 may store a command and/or data necessary for the operation of the processor 500. The system memory 700 may be SRAM or DRAM but is not restricted thereto.

As described above, according to some embodiments of the inventive concept, a PCI device includes a unit that allows a PCI host to set an offset of a memory area so that the PCI host can access the memory area of the PCI device, thereby enabling data larger than the size of a PCI BAR to be transmitted without special interaction between the PCI host and the PCI device. In addition, since the PCI host is allowed to set the offset of the memory area in the PCI device, the PCI host is able to efficiently transmit a large amount of data to the PCI device.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A Peripheral Component Interconnect (PCI) device, comprising:
a PCI register including a base address register (BAR) that determines a first memory area accessed by a PCI host;
an offset register that stores an offset received from the PCI host;
an address translation unit (ATU) that detects execution of an offset writing operation by the PCI host directed to the offset register, and in response, changes a memory area accessed by the PCI host to a second memory area based on the offset stored in the offset register; and
a device memory, including the first memory area and the second memory area, that stores data received from the PCI host and transmits stored data to the PCI host.

2. The PCI device of claim 1, wherein the BAR stores a base address, the first memory area is determined based on the base address and a size of the BAR, and the second memory area is determined based on the base address, the offset, and the size of the BAR.

3. The PCI device of claim 2, wherein the first memory area occupies memory locations extending from the base address to an address derived by adding the base address and the size of the BAR, and
the second memory area occupies memory locations extending from an address derived by adding the base address and the offset to an address resulting from adding the size of the BAR to the address derived by adding the base address and the offset.

4. The PCI device of claim 1, further comprising:
a status register that stores changed status information for the memory area accessed by the PCI host; and
an interrupt generator that receives the changed status information and transmits a change status interrupt to the PCI host in response to the changed status information.

5. The PCI device of claim 1, wherein the offset register is disposed within the PCI register, and the ATU reads the offset from the offset register disposed in the PCI register and changes the memory area accessed by the PCI host to the second memory area based on the offset read by the ATU.

6. The PCI device of claim 1, wherein the data received from the PCI host comprises the offset, and
the ATU changes the memory area accessed by the PCI host to the second memory area based on the offset included in the data received from the PCI host.

7. A Peripheral Component Interconnect (PCI) device, comprising:
- a PCI register including a base address register (BAR) that stores a base address that determines a memory area accessed by a PCI host;
- at least one offset register that stores a first offset and a second offset received from the PCI host;
- a device memory comprising a first memory area and a second memory area; and
- an address translation unit (ATU) that detects execution of an offset writing operation by the PCI host that stores the first offset and the second offset to the at least one offset register,
- wherein during a writing operation of writing data received from the PCI host to the device memory, the ATU is configured to
  - change the memory area accessed by the PCI host to the first memory area in response to the first offset, and
  - change the memory area accessed by the PCI host to the first memory area in response to the first offset, and thereafter change the memory area accessed by the PCI host to the second memory area in response to the second offset.

8. The PCI device of claim 7, wherein the first memory area is determined based on the base address, the first offset, and a size of the BAR, and
the second memory area is determined based on the base address, the second offset, and the size of the BAR.

9. The PCI device of claim 8, wherein the first memory area occupies memory locations extending from an address derived by adding the base address and the first offset to an address derived by adding the size of the BAR to the address resulting from adding the base address and the first offset, and
the second memory area occupies memory locations extending from an address derived by adding the base address and the second offset to an address obtained by adding the size of the BAR to the address derived by adding the base address and the second offset, and the first offset is different from the second offset.

10. The PCI device of claim 7, further comprising:
a status register that stores changed status information for the memory area accessed by the PCI host; and
an interrupt generator that receives the changed status information and transmits a change status interrupt to the PCI host in response to the changed status information.

11. The PCI device of claim 7, wherein the at least one offset register is disposed within the PCI register.

12. The PCI device of claim 7, wherein the data received from the PCI host comprises at least one of the first offset.

13. The PCI device of claim 7, wherein the at least one offset register is disposed in a memory area determined by the BAR, and the PCI host writes at least one of the first offset and the second offset to the at least one offset register within the memory area determined by the BAR in response to a size of the BAR.

14. A method of controlling an operation of a Peripheral Component Interconnect (PCI) system including a PCI device and a PCI host connected to each other by a PCI bus, the method comprising:
while writing data from the PCI host to a memory of the PCI device, determining whether a size of the data is greater than a size of a Base Address Register (BAR) of the PCI device; and
upon determining that the size of the data is greater than the size of the BAR,
  writing a first offset received from the PCI host to an offset register of the PCI device to change a memory area accessed by the PCI host to a first memory area, and writing a first part of the data to the first memory area, and
  writing a second offset received from the PCI host to the offset register of the PCI device to change the first memory area to a second memory area, and writing a second part of the data, different from the first part of the data, to the second memory area.

15. The method of claim 14, wherein the offset register is disposed in one of a PCI controller of the PCI device, a PCI register of the PCI controller of the PCI device, and the memory of the PCI device.

16. The method of claim 14, wherein the first memory area is defined in response to a base address stored in the BAR, the first offset written in the offset register, and the size of the BAR, and
the second memory area is defined in response to the base address stored in the BAR, the second offset written in the offset register, and the size of the BAR.

17. The method of claim 14, further comprising:
upon writing the first offset in the offset register, updating change status information stored in a status register; and
upon writing the second offset in the offset register, updating the change status information stored in the status register.

18. The method of claim 17, further comprising:
generating a change status interrupt in the PCI device in response to the updating of the change status information, and transmitting the change status interrupt to the PCI host.

19. The method of claim 14, further comprising:
upon determining that the size of the data is not greater than the size of the BAR, writing only the first offset to the offset register to change the memory area accessed by the PCI host to the first memory area; and
writing the data to the first memory area.

20. The method of claim 19, wherein the first memory area is defined in response to a base address written in the BAR, the first offset stored in the offset register, and the size of the BAR.

* * * * *